United States Patent
Kulchytskyy

(10) Patent No.: US 10,133,471 B2
(45) Date of Patent: Nov. 20, 2018

(54) BIOMETRIC SHORTCUTS

(71) Applicant: SugarCRM Inc., Cupertino, CA (US)

(72) Inventor: Vladyslav Kulchytskyy, Nashua, NH (US)

(73) Assignee: SUGARCRM INC., Cupertino, CA (US)

( * ) Notice: Subject to any disclaimer, the term of this patent is extended or adjusted under 35 U.S.C. 154(b) by 95 days.

(21) Appl. No.: 15/096,471

(22) Filed: Apr. 12, 2016

(65) Prior Publication Data

US 2017/0293409 A1 Oct. 12, 2017

(51) Int. Cl.
*G06K 9/00* (2006.01)
*G06F 3/0487* (2013.01)
*G06F 21/32* (2013.01)

(52) U.S. Cl.
CPC ....... *G06F 3/0487* (2013.01); *G06K 9/00013* (2013.01); *G06K 9/00087* (2013.01); *G06F 21/32* (2013.01); *G06F 2203/04808* (2013.01)

(58) Field of Classification Search
CPC ... G06F 3/0487; G06F 21/32; G06K 9/00013; G06K 9/00087; G06K 9/00084; G06K 9/00019; G06K 9/00065; G06K 9/00026
See application file for complete search history.

(56) References Cited

U.S. PATENT DOCUMENTS

| | | | | |
|---|---|---|---|---|
| 4,210,899 A * | 7/1980 | Swonger | ............... | A61B 5/1172 340/5.53 |
| 6,023,522 A * | 2/2000 | Draganoff | .......... | G06K 9/00013 348/572 |
| 6,651,168 B1 * | 11/2003 | Kao | ........................ | G06F 21/32 713/155 |
| 9,477,827 B1 * | 10/2016 | Daniel | ..................... | G06F 21/32 |
| 9,648,015 B1 * | 5/2017 | Avetisov | ............. | H04L 63/0861 |
| 2003/0028811 A1 * | 2/2003 | Walker | ............... | G07C 9/00158 726/5 |
| 2009/0058595 A1 * | 3/2009 | Mainguet | ................ | G06F 21/32 340/5.53 |
| 2015/0061826 A1 * | 3/2015 | Webber | .............. | G06K 7/10297 340/5.53 |
| 2017/0293409 A1 * | 10/2017 | Kulchytskyy | ......... | G06F 3/0487 |
| 2017/0293410 A1 * | 10/2017 | Kulchytskyy | ......... | G06F 3/0487 |

\* cited by examiner

*Primary Examiner* — Amir Alavi
(74) *Attorney, Agent, or Firm* — Steven M. Greenberg, Esq.; Shutts & Bowen LLP

(57) ABSTRACT

Embodiments of the present invention provide a method, system and computer program product for biometric shortcuts. In an embodiment of the invention, a biometric shortcut method includes storing in a database a multiplicity of different fingerprints, each in connection with a different command for a corresponding application and optionally acquired by way of a fingerprint scanner affixed to a computing device. An end user is then authenticated into use of the computing device and subsequent to authentication, a scanned fingerprint is then received in the fingerprint scanner and the scanned fingerprint is matched to one of the different fingerprints in the database. Thereafter, a command for a corresponding application stored in connection with the one of the different fingerprints matched to the scanned fingerprint is determined and the command is issued in the corresponding application executing in the computing device.

17 Claims, 2 Drawing Sheets

BIOMETRIC SHORTCUTS

BACKGROUND OF THE INVENTION

Field of the Invention

The present invention relates to biometrics and more particularly to the use of biometrics in application command and control.

Description of the Related Art

Biometrics refers to the measurement and statistical analysis of the physical and behavioral characteristics of an individual. Biometrics are primarily used for surveillance, identification and access control. The basic premise of biometric authentication is that each person is unique and that an individual can be identified by his or her intrinsic physical or behavioral traits. Fingerprint recognition, as an example of biometrics, refers to the automated identification or confirmation of the identity of an individual based upon the comparison of two fingerprints—one acquired in real time and one previously acquired.

Fingerprint recognition is one of the most well known forms of biometrics, and fingerprint recognition is by far the most used biometric solution for authentication on computerized systems. The reason for the popularity of fingerprint recognition is the ease of acquisition, established use and acceptance when compared to other biometrics, and that each individual likely has ten inherent sources of fingerprint data—one for each finger. Generally, a fingerprint verification system includes several logical components including a fingerprint sensing component, in which the fingerprint of an individual is acquired by a fingerprint scanner to produce a raw digital representation, a fingerprint preprocessing component, in which the input fingerprint is enhanced and adapted to simplify the task of feature extraction, a fingerprint feature extraction componet, in which the fingerprint is further processed to generate discriminative properties, also called feature vectors, and a fingerprint matching component, in which the feature vector of the input fingerprint is compared against one or more existing templates.

Fingerprint verifications systems have been successfully deployed in personal and mobile computing. Specifically, small fingerprint scanners have been embedded in the casement of a computing device and firmware executing at bootstrap of the device reads a fingerprint from an individual in order to authenticate the use of the device by the individual. As such, a high degree of data security can be provided on a mobile device by preventing the complete bootstrap of a device when encountering an individual with an invalid fingerprint scan. Optionally, as an additional layer of security, data resident on fixed storage in a device is encrypted and decryption of that data is only performed subsequent to the authentication of an authorized end user based upon fingerprint recognition.

BRIEF SUMMARY OF THE INVENTION

Embodiments of the present invention address deficiencies of the art in respect to biometrics and provide a novel and non-obvious method, system and computer program product for biometric shortcuts. In an embodiment of the invention, a biometric shortcut method includes storing in a database a multiplicity of different fingerprints, each in connection with a different command for a corresponding application and optionally acquired by way of a fingerprint scanner affixed to a computing device. An end user then authenticates into use of the computing device and, subsequent to authentication, a scanned fingerprint is received in the fingerprint scanner and the scanned fingerprint is matched to one of the different fingerprints in the database. Thereafter, a command for a corresponding application stored in connection with the one of the different fingerprints matched to the scanned fingerprint is determined and the command is issued in the corresponding application executing in the computing device.

In one aspect of the embodiment, additional different fingerprints are stored in the database in connection with different commands in a different application and, when a fingerprint scanned by the fingerprint scanner is matched to one of the additional different fingerprints stored in the database, an associated one of the different commands for the different application is issued in the different application executing in the computing device. In another aspect of the embodiment, if it is determined that the corresponding application of the command stored in connection with the one of the different fingerprints matched to the scanned fingerprint is not executing in the computing device, ignoring the scanned fingerprint without issuing the command in the corresponding application. In yet another aspect of the embodiment, if it is determined that the corresponding application of the command stored in connection with the one of the different fingerprints matched to the scanned fingerprint is not executing in the computing device, executing the corresponding application in the computing device and then issuing the command in the corresponding application.

In another embodiment of the invention, a data processing system is configured for biometric shortcuts. The system includes a computing device with memory and at least one processor. The system also includes a fingerprint scanner disposed upon an encasement of the computing device and coupled to the memory and at least one processor. The system yet further includes a database coupled to the computing device and storing a multiplicity of different fingerprints each in connection with a different command for a corresponding application. Finally, the system includes a biometric shortcut module. The module includes program code which when executing in the memory by the at least one processor, is enabled to authenticate an end user into the use of the computing device, and subsequent to the authentication, to receive in the fingerprint scanner a scanned fingerprint, match the scanned fingerprint to one of the different fingerprints in the database, determine a command for a corresponding application stored in connection with the one of the different fingerprints matched to the scanned fingerprint and issue the command in the corresponding application executing in the memory of the computing device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for biometric shortcuts. In accordance with an embodiment of the invention, a multiplicity of different fingerprints from different fingers are stored in a database and associated in a table with a different command or set of commands in a corresponding application. Thereafter, an end user is authenticated into the use of a computing device and an application is executed in memory of the computing device. Subsequent to authentication, a fingerprint is received by a fingerprint scanner of the computing device and compared to the fingerprints in the database. A matching one of the different fingerprints is located and an associated one of the command or set of commands for the executing application is identified. Finally, the associated one of the command or set of commands is executed in connection with the application executing in the memory of the computing device.

Figure 1:
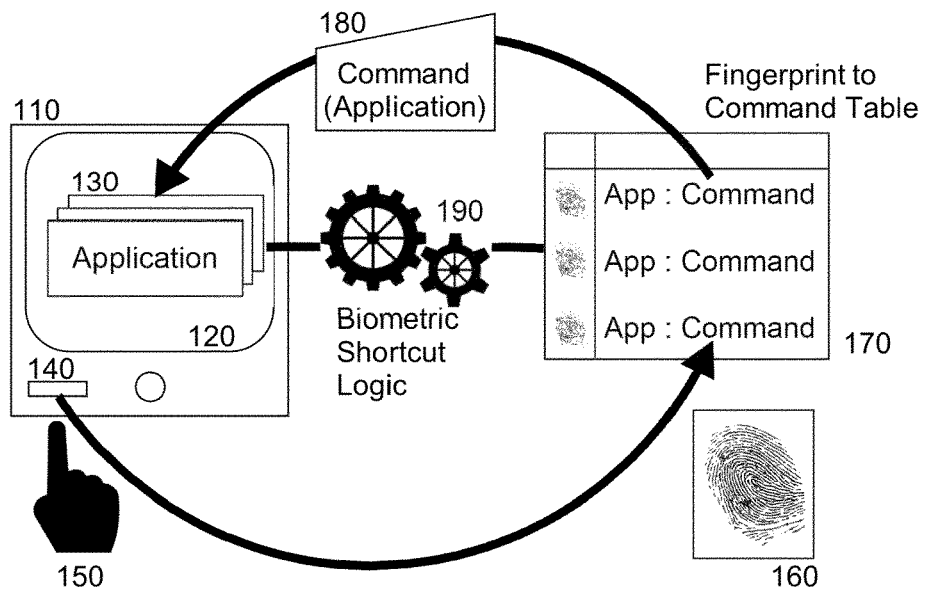
FIG. 1 is a pictorial illustration of a process for biometric shortcuts.

In further illustration, FIG. 1 pictorially shows a process for biometric shortcuts. As shown in FIG. 1, a computing device 110 such as a tablet computer, mobile computing device, smart phone, personal computer or laptop computer hosts the execution therein of one or more applications 130 accessible through a display 120. An end user applies a finger 150 to a fingerprint scanner 140 affixed to the casement of the computing device 110 and a fingerprint 160 for the end user is acquired. Thereafter, biometric shortcut logic 190 compares the acquired fingerprint 160 to a table of fingerprints 170 in order to identify a matching fingerprint corresponding to a particular one of the applications 130 and a command (directive) therefor.

Upon locating a matching fingerprint in the table 170, the biometric shortcut logic 190 applies the corresponding command 180 for the corresponding one of the applications 130 to the corresponding one of the applications 130. In this way, different commands for different ones of the applications 130 can be defined in the table 170 to correspond to different fingers of an end user. Consequently, the end user can rapidly invoke application commands merely by swiping an appropriate one of the fingers of the end user across the fingerprint scanner 140.

Figure 2:
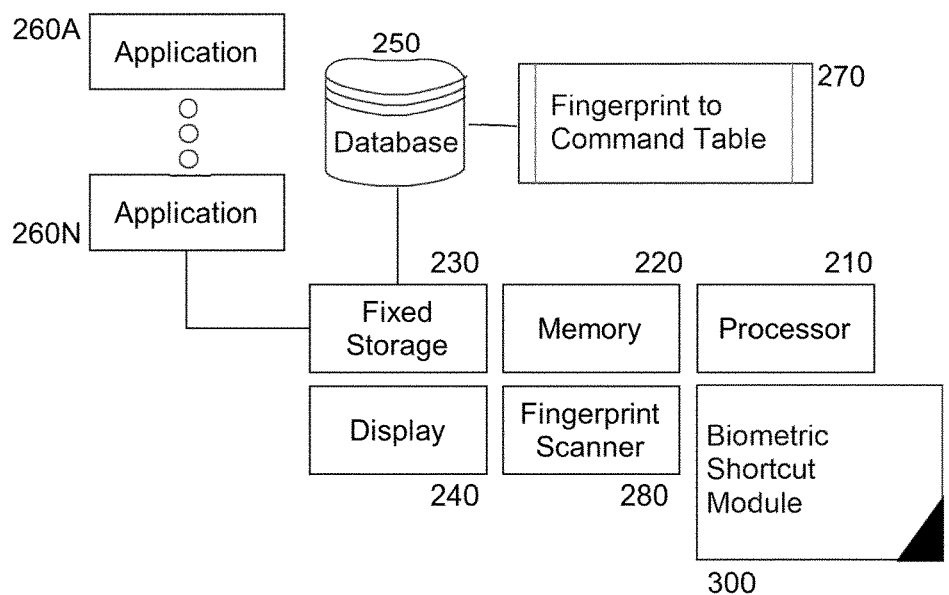
FIG. 2 is a schematic illustration of a data processing system configured for biometric shortcuts; and, FIG. 3 is a flow chart illustrating a process for biometric shortcuts.

The process described in connection with FIG. 1 is implemented in a data processing system. In yet further illustration, FIG. 2 schematically shows a data processing system configured for biometric shortcuts. The system includes memory 220 and at least one processor 210. The system additionally includes a display 240, a fingerprint scanner 280 and fixed storage 230. One or more applications 260A, 260N are stored in the fixed storage 230 from which the applications 260A, 260N may be loaded into the memory 220 and executed by the processor 210. As well, a database 250 is defined in the fixed storage 230 and includes a fingerprint-to-command table 270 that includes different entries for different fingerprints of different fingers of either a single end user or multiple end users, each entry specifying one of the applications 260A, 260N and a corresponding command.

Of note, a biometric shortcut module 300 executes in the memory 220 by the processor 210. The biometric shortcut module 300 includes program code enabled during execution by the processor to receive a fingerprint by way of the fingerprint scanner 280, to locate in the fingerprint-to-command table 270 a corresponding entry based upon the fingerprint and to identify both one of the applications 260A, 260N and a command for the one of the applications 260A, 260N with respect to the entry. The program code yet further is enabled during execution to issue the command to the one of the applications 260A, 260N to the extent that the one of the applications 260A, 260N is executing in the memory 220, and if not, to first launch the one of the applications 260A, 260N and then issue the command thereto.

Figure 3:
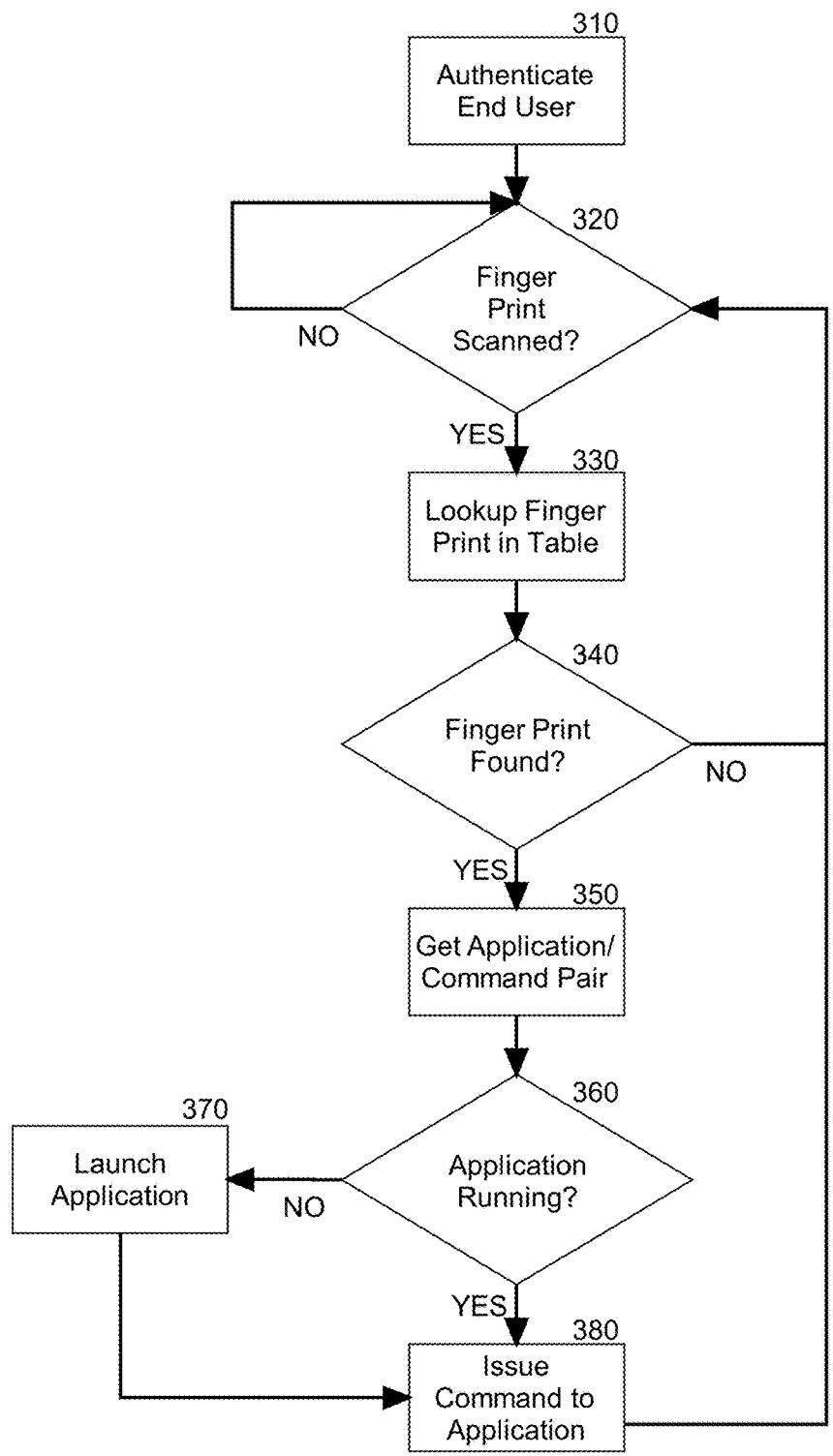

In even yet further illustration of the operation of the biometric shortcut module 300, FIG. 3 is a flow chart illustrating a process for biometric shortcuts. Beginning in block 310, an end user is authenticated into use of the computing device. In block 320, it is determined whether or not a finger has been scanned in a fingerprint scanner of the computing device and if so, in block 330 the scanned fingerprint is matched to an entry in the fingerprint-to-command table. In decision block 340, if an entry is not found for the scanned fingerprint, the scanned fingerprint is ignored. However, in decision block 340 if an entry is found for the scanned fingerprint, the process continues through block 350.

In block 350, an application and corresponding command are extracted from the entry. In decision block 360, it is determined whether or not the application is executing in the computing device. If not, the scanned fingerprint may be ignored, or in the alternative, as shown in FIG. 3, in block 370 the application may be launched. Thereafter, in block 380, the extracted command is issued to the executing application. Finally, the process returns to decision block 320.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A biometric shortcut method comprising:
   storing in a database a multiplicity of different fingerprints, each in connection with a different command for a corresponding application;
   authenticating an end user into use of a computing device; and,
   subsequent to authentication, receiving in a fingerprint scanner affixed to the computing device a scanned fingerprint, matching the scanned fingerprint to one of the different fingerprints in the database, determining a command for a corresponding application stored in connection with the one of the different fingerprints matched to the scanned fingerprint, and issuing the command in the corresponding application executing in the computing device.

2. The method of claim 1, wherein additional different fingerprints are stored in the database in connection with different commands in a different application and, when a fingerprint scanned by the fingerprint scanner is matched to one of the additional different fingerprints stored in the database, an associated one of the different commands for the different application is issued in the different application executing in the computing device.

3. The method of claim 1, wherein the multiplicity of different fingerprints are acquired by the fingerprint scanner.

4. The method of claim 1, wherein the database is disposed within the computing device.

5. The method of claim 1, wherein if it is determined that the corresponding application of the command stored in connection with the one of the different fingerprints matched to the scanned fingerprint is not executing in the computing device, ignoring the scanned fingerprint without issuing the command in the corresponding application.

6. The method of claim 1, wherein if it is determined that the corresponding application of the command stored in connection with the one of the different fingerprints matched to the scanned fingerprint is not executing in the computing device, executing the corresponding application in the computing device and then issuing the command in the corresponding application.

7. A data processing system configured for biometric shortcuts, the system comprising:
   a computing device with memory and at least one processor;
   a fingerprint scanner disposed upon an encasement of the computing device and coupled to the memory and at least one processor;
   a database coupled to the computing device and storing a multiplicity of different fingerprints, each in connection with a different command for a corresponding application; and, a biometric shortcut module comprising program code which when executing in the memory by the at least one processor, is enabled to authenticate an end user into use of the computing device, and subsequent to authentication, receive in the fingerprint scanner a scanned fingerprint, match the scanned fingerprint to one of the different fingerprints in the database, determine a command for a corresponding application stored in connection with the one of the different fingerprints matched to the scanned fingerprint and issue the command in the corresponding application executing in the memory of the computing device.

8. The system of claim 7, wherein additional different fingerprints are stored in the database in connection with different commands in a different application and, when a fingerprint scanned by the fingerprint scanner is matched to one of the additional different fingerprints stored in the database, an associated one of the different commands for the different application is issued in the different application executing in the computing device.

9. The system of claim 7, wherein the database is disposed within the computing device.

10. The system of claim 7, wherein if it is determined that the corresponding application of the command stored in connection with the one of the different fingerprints matched to the scanned fingerprint is not executing in the computing device, ignoring the scanned fingerprint without issuing the command in the corresponding application.

11. The system of claim 7, wherein if it is determined that the corresponding application of the command stored in connection with the one of the different fingerprints matched to the scanned fingerprint is not executing in the computing device, executing the corresponding application in the computing device and then issuing the command in the corresponding application.

12. A computer program product for biometric shortcuts, the computer program product comprising a non-transitory computer readable storage medium having program instructions embodied therewith, the program instructions executable by a device to cause the device to perform a method comprising:

storing in a database a multiplicity of different fingerprints, each in connection with a different command for a corresponding application;

authenticating an end user into use of a computing device; and, subsequent to authentication, receiving in a fingerprint scanner affixed to the computing device a scanned fingerprint, matching the scanned fingerprint to one of the different fingerprints in the database, determining a command for a corresponding application stored in connection with the one of the different fingerprints matched to the scanned fingerprint, and issuing the command in the corresponding application executing in the computing device.

13. The computer program product of claim 12, wherein additional different fingerprints are stored in the database in connection with different commands in a different application and, when a fingerprint scanned by the fingerprint scanner is matched to one of the additional different fingerprints stored in the database, an associated one of the different commands for the different application is issued in the different application executing in the computing device.

14. The computer program product of claim 12, wherein the multiplicity of different fingerprints are acquired by the fingerprint scanner.

15. The computer program product of claim 12, wherein the database is disposed within the computing device.

16. The computer program product of claim 12, wherein if it is determined that the corresponding application of the command stored in connection with the one of the different fingerprints matched to the scanned fingerprint is not executing in the computing device, ignoring the scanned fingerprint without issuing the command in the corresponding application.

17. The computer program product of claim 12, wherein if it is determined that the corresponding application of the command stored in connection with the one of the different fingerprints matched to the scanned fingerprint is not executing in the computing device, executing the corresponding application in the computing device and then issuing the command in the corresponding application.

* * * * *